(12) United States Patent
Garai et al.

(10) Patent No.: US 12,551,148 B2
(45) Date of Patent: Feb. 17, 2026

(54) SYSTEMS AND METHODS FOR COMPENSATING FOR AGENT ELUTION

(71) Applicant: Medtronic MiniMed, Inc., Northridge, CA (US)

(72) Inventors: Ellis Garai, Woodland Hills, CA (US); Sarkis D. Aroyan, Northridge, CA (US); Anuj M. Patel, Porter Ranch, CA (US); Ashwin K. Rao, West Hills, CA (US)

(73) Assignee: Medtronic MiniMed, Inc., Northridge, CA (US)

( * ) Notice: Subject to any disclaimer, the term of this patent is extended or adjusted under 35 U.S.C. 154(b) by 485 days.

(21) Appl. No.: 18/136,417

(22) Filed: Apr. 19, 2023

(65) Prior Publication Data

US 2023/0404448 A1    Dec. 21, 2023

Related U.S. Application Data

(60) Provisional application No. 63/346,338, filed on May 27, 2022.

(51) Int. Cl.
| | | |
|---|---|---|
| *A61B 5/1495* | (2006.01) | |
| *A61B 5/00* | (2006.01) | |
| *A61B 5/145* | (2006.01) | |
| *A61B 5/1486* | (2006.01) | |

(52) U.S. Cl.
CPC ........ *A61B 5/1495* (2013.01); *A61B 5/14532* (2013.01); *A61B 5/14865* (2013.01); *A61B 5/4839* (2013.01); *A61B 5/7203* (2013.01); *A61B 5/7221* (2013.01); *A61B 2560/0276* (2013.01)

(58) Field of Classification Search
CPC ... A61B 5/1495; A61B 5/7203; A61B 5/7221; A61B 5/14532; A61B 5/14865; A61B 5/1473
See application file for complete search history.

(56) References Cited

U.S. PATENT DOCUMENTS

| | | |
|---|---|---|
| 4,755,173 A | 7/1988 | Konopka et al. |
| 5,391,250 A | 2/1995 | Cheney, II et al. |
| 5,485,408 A | 1/1996 | Blomquist |
| 5,522,803 A | 6/1996 | Teissen-Simony |
| 5,665,065 A | 9/1997 | Colman et al. |

(Continued)

*Primary Examiner* — Jason M Sims
*Assistant Examiner* — Kyle W. Kretzer
(74) *Attorney, Agent, or Firm* — Carter, DeLuca & Farrell, LLP

(57) ABSTRACT

A method for compensating for a life-lengthening agent for a glucose sensor includes accessing first and second electrochemical impedance spectroscopy (EIS) values of at least one parameter based on first and second EIS procedures performed on EIS signals from a working electrode of the glucose sensor, calculating a change in the at least one parameter between the first and second EIS values, estimating a concentration of the agent based on the change in the at least one parameter, and calculating a model effect in response to the concentration. In a case where the model effect is not greater than the threshold, the method further includes adjusting a sensor glucose value based on the concentration and sensor signals from the working electrode, and displaying the adjusted sensor glucose value.

21 Claims, 12 Drawing Sheets

(56) References Cited

U.S. PATENT DOCUMENTS

| | | | |
|---|---|---|---|
| 5,800,420 | A | 9/1998 | Gross et al. |
| 5,807,375 | A | 9/1998 | Gross et al. |
| 5,925,021 | A | 7/1999 | Castellano et al. |
| 5,954,643 | A | 9/1999 | VanAntwerp et al. |
| 6,017,328 | A | 1/2000 | Fischell et al. |
| 6,186,982 | B1 | 2/2001 | Gross et al. |
| 6,246,992 | B1 | 6/2001 | Brown |
| 6,248,067 | B1 | 6/2001 | Causey, III et al. |
| 6,248,093 | B1 | 6/2001 | Moberg |
| 6,355,021 | B1 | 3/2002 | Nielsen et al. |
| 6,379,301 | B1 | 4/2002 | Worthington et al. |
| 6,544,212 | B2 | 4/2003 | Galley et al. |
| 6,558,351 | B1 | 5/2003 | Steil et al. |
| 6,591,876 | B2 | 7/2003 | Safabash |
| 6,641,533 | B2 | 11/2003 | Causey, III et al. |
| 6,736,797 | B1 | 5/2004 | Larsen et al. |
| 6,749,587 | B2 | 6/2004 | Flaherty |
| 6,766,183 | B2 | 7/2004 | Walsh et al. |
| 6,801,420 | B2 | 10/2004 | Talbot et al. |
| 6,804,544 | B2 | 10/2004 | Van Antwerp et al. |
| 7,003,336 | B2 | 2/2006 | Holker et al. |
| 7,029,444 | B2 | 4/2006 | Shin et al. |
| 7,066,909 | B1 | 6/2006 | Peter et al. |
| 7,137,964 | B2 | 11/2006 | Flaherty |
| 7,303,549 | B2 | 12/2007 | Flaherty et al. |
| 7,399,277 | B2 | 7/2008 | Saidara et al. |
| 7,442,186 | B2 | 10/2008 | Blomquist |
| 7,602,310 | B2 | 10/2009 | Mann et al. |
| 7,647,237 | B2 | 1/2010 | Malave et al. |
| 7,699,807 | B2 | 4/2010 | Faust et al. |
| 7,727,148 | B2 | 6/2010 | Talbot et al. |
| 7,785,313 | B2 | 8/2010 | Mastrototaro |
| 7,806,886 | B2 | 10/2010 | Kanderian, Jr. et al. |
| 7,819,843 | B2 | 10/2010 | Mann et al. |
| 7,828,764 | B2 | 11/2010 | Moberg et al. |
| 7,879,010 | B2 | 2/2011 | Nunn et al. |
| 7,890,295 | B2 | 2/2011 | Shin et al. |
| 7,892,206 | B2 | 2/2011 | Moberg et al. |
| 7,892,748 | B2 | 2/2011 | Norrild et al. |
| 7,901,394 | B2 | 3/2011 | Ireland et al. |
| 7,942,844 | B2 | 5/2011 | Moberg et al. |
| 7,946,985 | B2 | 5/2011 | Mastrototaro et al. |
| 7,955,305 | B2 | 6/2011 | Moberg et al. |
| 7,963,954 | B2 | 6/2011 | Kavazov |
| 7,977,112 | B2 | 7/2011 | Burke et al. |
| 7,979,259 | B2 | 7/2011 | Brown |
| 7,985,330 | B2 | 7/2011 | Wang et al. |
| 8,024,201 | B2 | 9/2011 | Brown |
| 8,100,852 | B2 | 1/2012 | Moberg et al. |
| 8,114,268 | B2 | 2/2012 | Wang et al. |
| 8,114,269 | B2 | 2/2012 | Cooper et al. |
| 8,137,314 | B2 | 3/2012 | Mounce et al. |
| 8,181,849 | B2 | 5/2012 | Bazargan et al. |
| 8,182,462 | B2 | 5/2012 | Istoc et al. |
| 8,192,395 | B2 | 6/2012 | Estes et al. |
| 8,195,265 | B2 | 6/2012 | Goode, Jr. et al. |
| 8,202,250 | B2 | 6/2012 | Stutz, Jr. |
| 8,207,859 | B2 | 6/2012 | Enegren et al. |
| 8,226,615 | B2 | 7/2012 | Bikovsky |
| 8,257,259 | B2 | 9/2012 | Brauker et al. |
| 8,267,921 | B2 | 9/2012 | Yodfat et al. |
| 8,275,437 | B2 | 9/2012 | Brauker et al. |
| 8,277,415 | B2 | 10/2012 | Mounce et al. |
| 8,292,849 | B2 | 10/2012 | Bobroff et al. |
| 8,298,172 | B2 | 10/2012 | Nielsen et al. |
| 8,303,572 | B2 | 11/2012 | Adair et al. |
| 8,305,580 | B2 | 11/2012 | Aasmul |
| 8,308,679 | B2 | 11/2012 | Hanson et al. |
| 8,313,433 | B2 | 11/2012 | Cohen et al. |
| 8,318,443 | B2 | 11/2012 | Norrild et al. |
| 8,323,250 | B2 | 12/2012 | Chong et al. |
| 8,343,092 | B2 | 1/2013 | Rush et al. |
| 8,352,011 | B2 | 1/2013 | Van Antwerp et al. |
| 8,353,829 | B2 | 1/2013 | Say et al. |
| 9,672,328 | B2 | 6/2017 | Saint et al. |
| 10,835,727 | B2 | 11/2020 | Montalvo et al. |
| 2007/0123819 | A1 | 5/2007 | Mernoe et al. |
| 2010/0160861 | A1 | 6/2010 | Causey, III et al. |
| 2013/0332085 | A1* | 12/2013 | Yang .................... A61B 5/6849 702/22 |
| 2020/0327973 | A1 | 10/2020 | Pryor et al. |
| 2021/0076990 | A1* | 3/2021 | Alimohammadi ... A61B 5/1473 |
| 2022/0296867 | A1* | 9/2022 | Avula ................. A61B 5/14532 |

\* cited by examiner

SYSTEMS AND METHODS FOR COMPENSATING FOR AGENT ELUTION

CROSS-REFERENCE TO RELATED APPLICATIONS

This application claims the benefit of the filing date of provisional U.S. Patent Application No. 63/346,338, filed on May 27, 2022.

FIELD

The present disclosure relates generally to sensor technology, including sensors used for sensing a variety of physiological parameters, e.g., glucose concentration, and more particularly, to sensor systems and methods for compensating for elution of an agent, which lengthens the lifetime of the sensor.

BACKGROUND

Over the years, a variety of sensors have been developed for detecting and/or quantifying specific agents or compositions in a patient's blood, which enable patients and medical personnel to monitor physiological conditions within the patient's body. Illustratively, subjects may wish to monitor blood glucose levels in a subject's body on a continuing basis. Thus, glucose sensors have been developed for use in obtaining an indication of blood glucose levels in a diabetic patient. Such readings are useful in monitoring and/or adjusting a treatment regimen which typically includes the regular administration of insulin to the patient. Presently, a patient can measure his/her blood glucose (BG) using a BG measurement device (i.e., glucose meter), such as a test strip meter, a continuous glucose measurement system (or a continuous glucose monitor), or a hospital BG test. BG measurement devices use various methods to measure the BG level of a patient, such as a sample of the patient's blood, a sensor in contact with a bodily fluid, an optical sensor, an enzymatic sensor, or a fluorescent sensor. When the BG measurement device has generated a BG measurement, the measurement is displayed on the BG measurement device.

Further, continuous glucose monitoring (CGM) has been used to continuously monitor glucose levels in a user and alerts the user when the glucose level is outside of the normal range. The glucose levels can be measured based on raw glucose sensor values (e.g., the sensor current) and the counter voltage to measure glucose values. When a working electrode of the CGM is inserted into a patient's skin or subcutaneous layer, the working electrode generally lasts about a week because oxidation and reduction occur repeatedly around the working electrode and the working electrode is corroded. Further, chemicals are deposited over the working electrode. Due to the corrosion and chemical deposits, performance efficiency and accuracy of the working electrode continuously deteriorates and the measurement values become inaccurate. This potentially exposes the user to certain risks if the deteriorated working electrode is continuously used.

SUMMARY

The present disclosure relates to systems and methods for compensating for elution of an agent, which lengthens the lifetime of a sensor. In accordance with embodiments of the present disclosure, a method for compensating for an agent lengthens a life of a glucose sensor monitoring a level of glucose in a body of a user. The glucose sensor includes a first flex having a working electrode and a second flex coated with the agent. The present method includes accessing a first electrochemical impedance spectroscopy (EIS) value of at least one parameter. The first EIS value is based on a first EIS procedure performed on EIS signals from the working electrode at an initiation time when the first flex and the second flex enter into the body of the user and the glucose sensor initiates sensing a level of glucose. A second EIS value of the at least one parameter is assessed, where the second EIS value is based on a second EIS procedure performed on EIS signals from the working electrode at a second time after the initiation time. The method further includes calculating a change in the at least one parameter between the first EIS value and the second EIS value, estimating a concentration of the agent based on the change in the at least one parameter, calculating a model effect in response to the concentration, and determining whether the model effect is greater than a threshold. In a case where the model effect is determined to be greater than the threshold, the method further includes adjusting a sensor glucose value based on the concentration and sensor signals from the working electrode, and displaying the adjusted sensor glucose value.

In various embodiments of the present disclosure, the agent is selected from dexamethasone, dexamethasone phosphate, dexamethasone acetate, corticosteroids, NSAIDs, antifibrotic agents, and siRNA.

In various embodiments of the present disclosure, the first and second EIS values are real impedance values at a specific frequency. The specific frequency is greater than or equal to 4 Hz.

In various embodiments of the present disclosure, the method further includes removing an auto mode, which causes an insulin delivery device to automatically deliver insulin to the user based on the sensor glucose value.

In various embodiments of the present disclosure, determining whether the model effect in response to the concentration is greater than the threshold is performed by mapping the model effect to a confidence value, where the confidence value is within a confidence range. Determining whether the model effect in response to the concentration is greater than the threshold is further performed by determining whether the confidence value falls within a predetermined range. The predetermined range is a subset of the confidence range.

In various embodiments of the present disclosure, in a case where it is determined that the confidence value does not fall within the predetermined range, the method further includes blanking out the sensor glucose value.

In accordance with embodiments of the present disclosure, a glucose monitoring system includes a first flex having a working electrode and a second flex being covered with an agent, which lengthens a lifetime of the glucose sensor, and monitoring a level of glucose in a body of the user, and a controller. The controller is configured to access a first electrochemical impedance spectroscopy (EIS) value of at least one parameter, where the first EIS value is based on a first EIS procedure performed on EIS signals from the working electrode at an initiation time when the first flex and the second flex enter into the body of the user and the glucose sensor initiates sensing a level of glucose. A second EIS value of the at least one parameter is assessed, where the second EIS value is based on a second EIS procedure performed on EIS signals from the working electrode at a second time after the initiation time. The controller is further configured to: calculate a change in the at least one parameter between the first EIS value and the second EIS value; estimate a concentration of the agent based on the change in the at least one parameter; and determine whether a model effect in response to the concentration is greater than a threshold. In a case where the model effect is determined to be greater than the threshold, the controller is further configured to adjust a sensor glucose value based on the concentration and sensor signals from the working electrode, and display the adjusted sensor glucose value.

In accordance with embodiments of the present disclosure, a non-transitory processor readable medium includes instructions stored thereon which, when executed by a processor, causes performance of a method for compensating for an agent which lengthens a life of a glucose sensor monitoring a level of glucose in a body of a user. The glucose sensor includes a first flex having a working electrode and a second flex being coated with the agent. The method includes: accessing a first electrochemical impedance spectroscopy (EIS) value of at least one parameter, where the first EIS value is based on a first EIS procedure performed on EIS signals from the working electrode at an initiation time when the first flex and the second flex enter into the body of the user and the glucose sensor initiates sensing a level of glucose; and accessing a second EIS value of the at least one parameter, where the second EIS value is based on a second EIS procedure performed on EIS signals from the working electrode at a second time after the initiation time. The method further includes calculating a change in the at least one parameter between the first EIS value and the second EIS value; estimating a concentration of the agent based on the change in the at least one parameter; calculating a model effect in response to the concentration; and determining whether the model effect is greater than a threshold. In a case where the model effect is determined to be greater than the threshold, the method further includes adjusting a sensor glucose value based on the concentration and sensor signals from the working electrode, and displaying a glucose measurement value based on the adjusted EIS signals.

In accordance with embodiments of the present disclosure, a glucose monitoring system includes a flex having a working electrode and monitoring a level of glucose in a body of the user. A portion of the flex is covered with an agent, which lengthens a lifetime of the glucose sensor. The glucose monitoring system further includes a controller configured to access a first electrochemical impedance spectroscopy (EIS) value of at least one parameter, where the first EIS value is based on a first EIS procedure performed on EIS signals from the working electrode at an initiation time when the flex enters into the body of the user and the glucose sensor initiates sensing a level of glucose. A second EIS value of the at least one parameter is assessed, where the second EIS value is based on a second EIS procedure performed on EIS signals from the working electrode at a second time after the initiation time. The controller is further configured to: calculate a change in the at least one parameter between the first EIS value and the second EIS value; estimate a concentration of the agent based on the change in the at least one parameter; and determine whether a model effect in response to the concentration is greater than a threshold. In a case where the model effect is determined to be greater than the threshold, the controller is further configured to adjust a sensor glucose value based on the concentration and sensor signals from the working electrode, and display the adjusted sensor glucose value.

The details of one or more embodiments of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

A detailed description of embodiments of the disclosure will be made with reference to the accompanying drawings, wherein like numerals designate corresponding parts in the figures.

DETAILED DESCRIPTION

In the following description, reference is made to the accompanying drawings which form a part hereof and which illustrate several embodiments of the present disclosure. It is understood that other embodiments may be utilized, and structural and operational changes may be made without departing from the scope of the present disclosure.

The embodiments herein are described below with reference to flowchart illustrations of methods, systems, devices, apparatus, and programming and computer program products. It will be understood that each block of the flowchart illustrations, and combinations of blocks in the flowchart illustrations, can be implemented by programming instructions, including computer program instructions (as can any menu screens described in the figures). These computer program instructions may be loaded onto a computer or other programmable data processing apparatus (such as a controller, microcontroller, or processor in a sensor electronics device) to produce a machine, such that the instructions which execute on the computer or other programmable data processing apparatus create instructions for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks, and/or menus presented herein. Programming instructions may also be stored in and/or implemented via electronic circuitry, including integrated circuits (ICs) and Application Specific Integrated Circuits (ASICs) used in conjunction with sensor devices, apparatuses, and systems.

Figure 1:
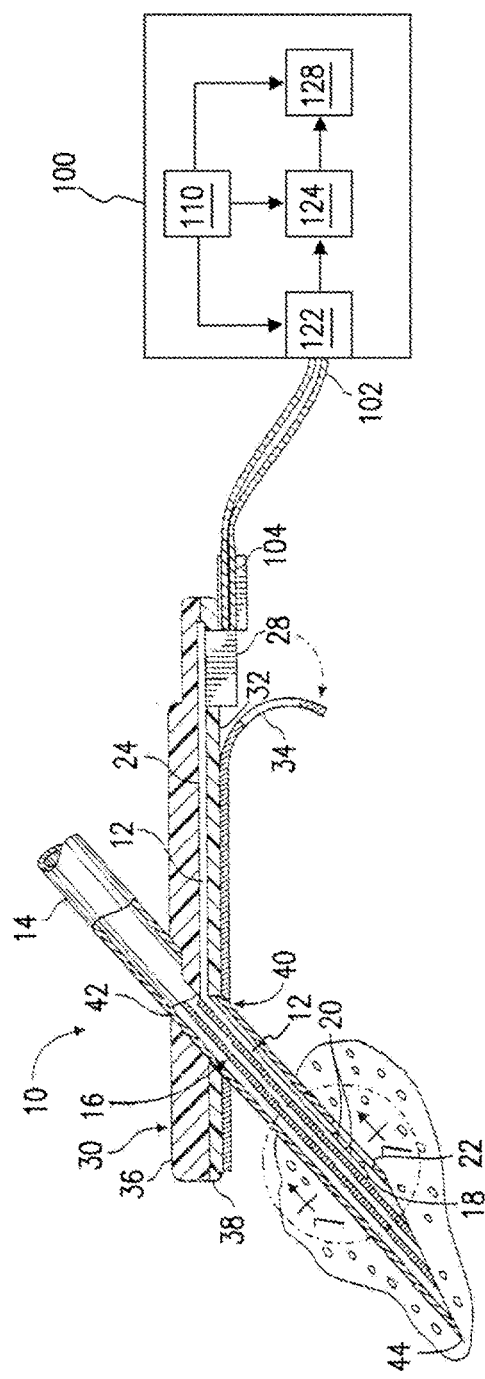
FIG. 1 illustrates a perspective view of a subcutaneous sensor insertion set and a block diagram of a sensor electronics device in accordance with one or more embodiments.

FIG. 1 is a perspective view of a subcutaneous sensor insertion set and a block diagram of a sensor electronics device according to various embodiments of the disclosure. As illustrated in FIG. 1, a subcutaneous sensor set 10 is provided for subcutaneous placement of an active portion of a flexible sensor 12 (see, e.g., FIG. 2), or the like, at a selected site in the body of a user. The subcutaneous or percutaneous portion of the sensor set 10 includes a hollow, slotted insertion needle 14, and a cannula 16. The needle 14 is used to facilitate quick and easy subcutaneous placement of the cannula 16 at the subcutaneous insertion site. Inside the cannula 16 is a sensing portion 18 of the sensor 12 to expose one or more sensor electrodes 20 to the user's bodily fluids through a window 22 formed in the cannula 16. In an embodiment of the disclosure, the one or more sensor electrodes 20 may include a counter electrode, a reference electrode, and one or more working electrodes. After insertion, the insertion needle 14 is withdrawn to leave the cannula 16 with the sensing portion 18 and the sensor electrodes 20 in place at the selected insertion site.

In particular embodiments, the subcutaneous sensor set 10 facilitates accurate placement of a flexible thin film electrochemical sensor 12 of the type used for monitoring specific blood parameters representative of a user's condition. The sensor 12 monitors glucose levels in the body and may be used in conjunction with automated or semi-automated medication infusion pumps of the external or implantable type as described, e.g., in U.S. Pat. Nos. 4,562,751; 4,678,408; 4,685,903 or 4,573,994, the entire contents of which are incorporated herein by reference, to control delivery of insulin to a diabetic patient.

Particular embodiments of the flexible electrochemical sensor 12 are constructed in accordance with thin film mask techniques to include elongated thin film conductors embedded or encased between layers of a selected insulative material such as polyimide film or sheet, and membranes. The sensor electrodes 20 at a tip end of the sensing portion 18 are exposed through one of the insulative layers for direct contact with patient blood or other body fluids, when the sensing portion 18 (or active portion) of the sensor 12 is subcutaneously placed at an insertion site. The sensing portion 18 is joined to a connection portion 24 that terminates in conductive contact pads, or the like, which are also exposed through one of the insulative layers. In alternative embodiments, other types of implantable sensors, such as chemical based, optical based, or the like, may be used.

As is known in the art, the connection portion 24 and the contact pads are generally adapted for a direct wired electrical connection to a suitable monitor or sensor electronics device 100 for monitoring a user's condition in response to signals derived from the sensor electrodes 20. Further description of flexible thin film sensors of this general type may be found, e.g., in U.S. Pat. No. 5,391,250, which is herein incorporated by reference. The connection portion 24 may be conveniently connected electrically to the monitor or sensor electronics device 100 or by a connector block 28 (or the like) as shown and described, e.g., in U.S. Pat. No. 5,482,473, which is also herein incorporated by reference. Thus, in accordance with embodiments of the present disclosure, subcutaneous sensor sets 10 may be configured or formed to work with either a wired or a wireless characteristic monitor system.

The sensor electrodes 20 may be used in a variety of sensing applications and may be configured in a variety of ways. For example, the sensor electrodes 20 may be used in physiological parameter sensing applications in which some type of biomolecule is used as a catalytic agent. For example, the sensor electrodes 20 may be used in a glucose and oxygen sensor having a glucose oxidase (GOx) enzyme catalyzing a reaction with the sensor electrodes 20. The reaction produces Gluconic Acid ($C_6H_{12}O_7$) and Hydrogen Peroxide ($H_2O_2$) in proportion to the amount of glucose present.

The sensor electrodes 20, along with a biomolecule or some other catalytic agent, may be placed in a human body in a vascular or non-vascular environment. For example, the sensor electrodes 20 and biomolecule may be placed in a vein and be subjected to a blood stream, or may be placed in a subcutaneous or peritoneal region of the human body.

The monitor 100 may also be referred to as a sensor electronics device 100. The monitor 100 may include a power source 110, a sensor interface 122, processing electronics 124, and data formatting electronics 128. The monitor 100 may be coupled to the sensor set 10 by a cable 102 through a connector that is electrically coupled to the connector block 28 of the connection portion 24. In an alternative embodiment, the cable 102 may be omitted. In this embodiment of the disclosure, the monitor 100 may include an appropriate connector for direct connection to the connection portion 104 of the sensor set 10. The sensor set 10 may be modified to have the connector portion 104 positioned at a different location, e.g., on top of the sensor set 10 to facilitate placement of the monitor 100 over the sensor set 10.

In embodiments of the disclosure, the sensor interface 122, the processing electronics 124, and the data formatting electronics 128 are formed as separate semiconductor chips, however, alternative embodiments may combine the various semiconductor chips into a single or multiple customized semiconductor chips. The sensor interface 122 connects with the cable 102 that is connected with the sensor set 10.

The power source 110 may be a battery. The battery can include three series silver oxide battery cells. In alternative embodiments, different battery chemistries may be utilized, such as lithium based chemistries, alkaline batteries, nickel metalhydride, or the like, and a different number of batteries may be used. The monitor 100 provides power to the sensor set via the power source 110, through the cable 102 and cable connector 104. In an embodiment of the disclosure, the power is a voltage provided to the sensor set 10. In an embodiment of the disclosure, the power is a current provided to the sensor set 10. In an embodiment of the disclosure, the power is a voltage provided at a specific voltage to the sensor set 10.

Figure 2:
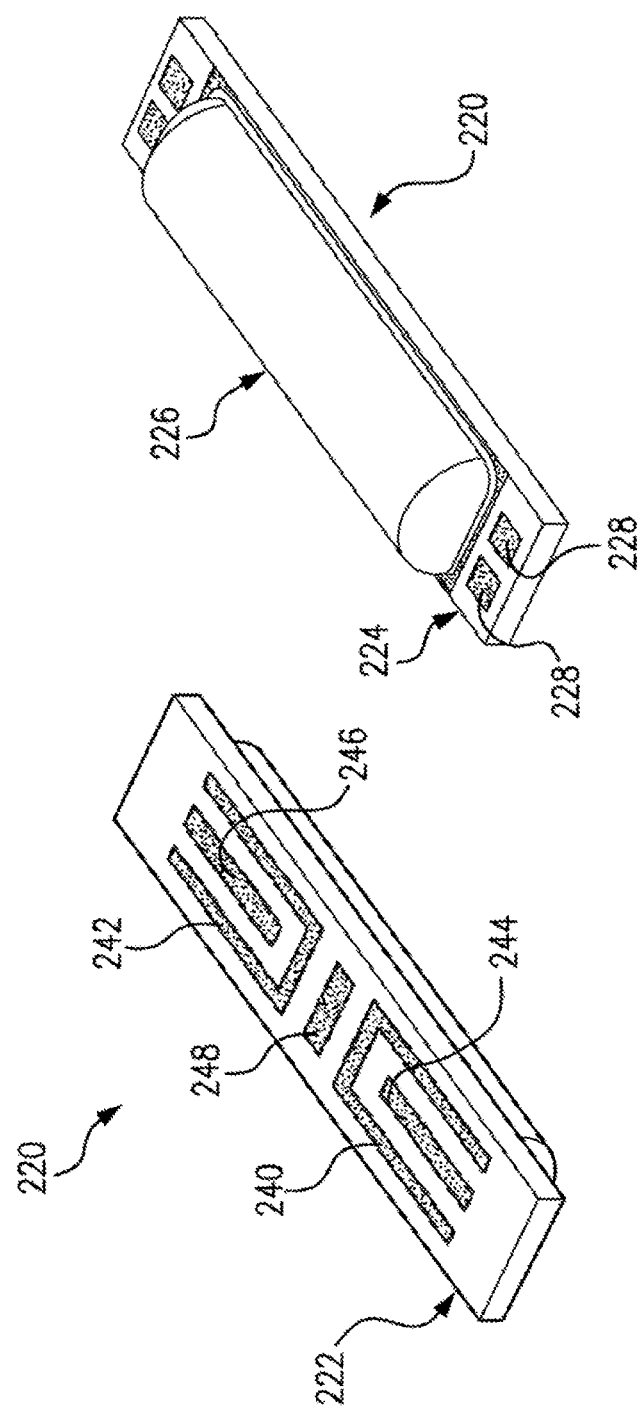
FIG. 2 illustrates a substrate having two sides, a first side which contains an electrode configuration and a second side which contains electronic circuitry in accordance with one or more embodiments.

FIG. 2 illustrates an implantable sensor and electronics for driving the implantable sensor according to an embodiment of the present disclosure. FIG. 2 shows a substrate or flex 220 having two sides; a first side 222 which contains an electrode configuration and a second side 224 of which contains electronic circuitry. As in FIG. 2, the first side 222 of the substrate includes two counter electrode-working electrode pairs 240, 242, 244, 246 on opposite sides of a reference electrode 248. A second side 224 of the substrate includes electronic circuitry. As shown, the electronic circuitry may be enclosed in a hermetically sealed casing 226, providing a protective housing for the electronic circuitry. This allows the sensor substrate 220 to be inserted into a vascular environment or other environment which may subject the electronic circuitry to fluids. By sealing the electronic circuitry in a hermetically sealed casing 226, the electronic circuitry may operate without risk of short circuiting by the surrounding fluids. Also shown in FIG. 2, pads 228 are connected to the input and output lines of the electronic circuitry. The electronic circuitry itself may be fabricated in a variety of ways. According to an embodiment of the present disclosure, the electronic circuitry may be fabricated as an integrated circuit using techniques common in the industry.

Figure 3:
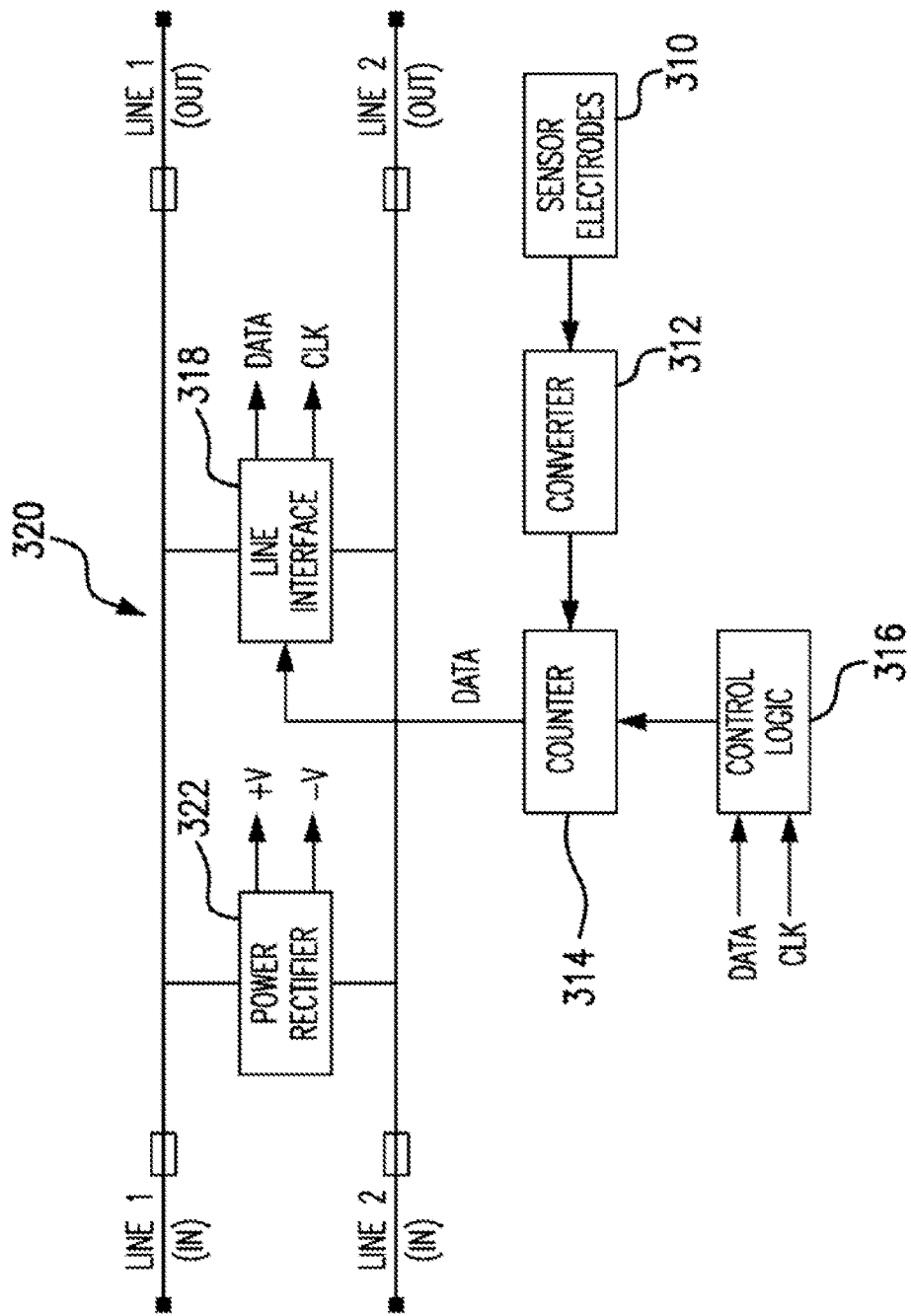
FIG. 3 illustrates a block diagram of an electronic circuit for sensing an output of a sensor in accordance with one or more embodiments.

FIG. 3 illustrates a general block diagram of an electronic circuit for sensing an output of a sensor according to embodiments of the present disclosure. At least one pair of sensor electrodes 310 may interface to a data converter 312, the output of which may interface to a counter 314. The counter 314 may be controlled by control logic 316. The output of the counter 314 may connect to a line interface 318. The line interface 318 may be connected to input and output lines 320 and may also connect to the control logic 316. The input and output lines 320 may also be connected to a power rectifier 322.

The sensor electrodes 310 may be used in a variety of sensing applications and may be configured in a variety of ways. For example, the sensor electrodes 310 may be used in physiological parameter sensing applications in which some type of biomolecule is used as a catalytic agent. For example, the sensor electrodes 310 may be used in a glucose and oxygen sensor having a glucose oxidase (GOx) enzyme catalyzing a reaction with the sensor electrodes 310. The sensor electrodes 310, along with a biomolecule or some other catalytic agent, may be placed in a human body in a vascular or non-vascular environment. For example, the sensor electrodes 310 and biomolecule may be placed in a vein and be subjected to a blood stream.

Figure 4:
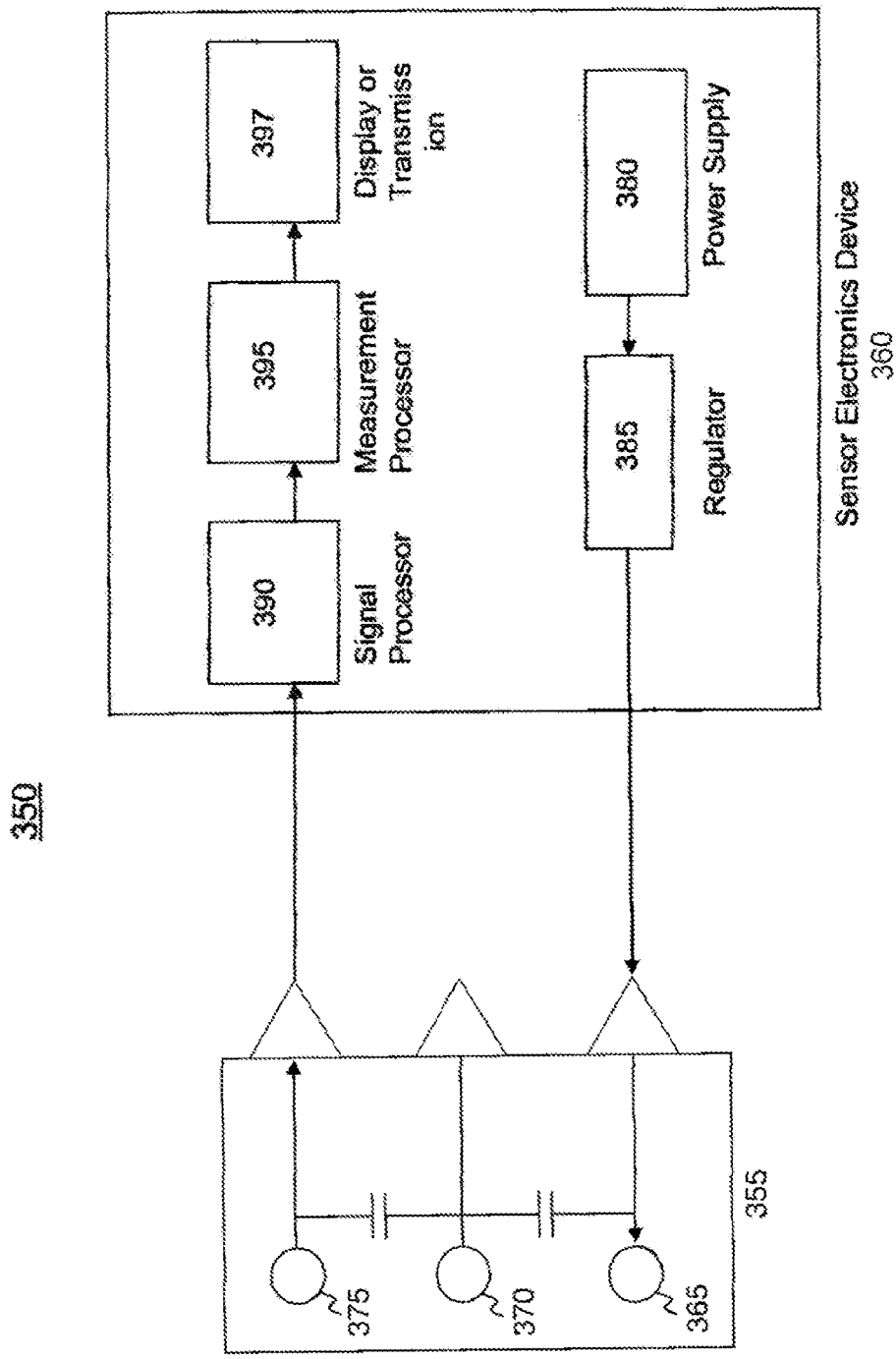
FIG. 4 illustrates a block diagram of a sensor electronics device and a sensor including a plurality of electrodes in accordance with one or more embodiments.

FIG. 4 illustrates a block diagram of a sensor electronics device and a sensor including a plurality of electrodes according to an embodiment of the disclosure. The sensor set or system 350 includes a sensor 355 and a sensor electronics device 360. The sensor 355 includes a counter electrode 365, a reference electrode 370, and a working electrode 375. The sensor electronics device 360 includes a power supply 380, a regulator 385, a signal processor 390, a measurement processor 395, and a display/transmission module 397. The power supply 380 provides power (in the form of either a voltage, a current, or a voltage including a current) to the regulator 385. The regulator 385 transmits a regulated voltage to the sensor 355. In an embodiment of the disclosure, the regulator 385 transmits a voltage to the counter electrode 365 of the sensor 355.

The sensor 355 creates a sensor signal indicative of a concentration of a physiological characteristic being measured. For example, the sensor signal may be indicative of a blood glucose reading. In an embodiment of the disclosure, utilizing subcutaneous sensors, the sensor signal may represent a level of hydrogen peroxide in a subject. In an embodiment of the disclosure, where blood or cranial sensors are utilized, the amount of oxygen is being measured by the sensor and is represented by the sensor signal. In an embodiment of the disclosure, utilizing implantable or long-term sensors, the sensor signal may represent a level of oxygen in the subject. The sensor signal may be measured at the working electrode 375. In an embodiment of the disclosure, the sensor signal may be a current measured at the working electrode. In an embodiment of the disclosure, the sensor signal may be a voltage measured at the working electrode.

The signal processor 390 receives the sensor signal (e.g., a measured current or voltage) after the sensor signal is measured at the sensor 355 (e.g., the working electrode). The signal processor 390 processes the sensor signal and generates a processed sensor signal. The measurement processor 395 receives the processed sensor signal and calibrates the processed sensor signal utilizing reference values. In an embodiment of the disclosure, the reference values are stored in a reference memory and provided to the measurement processor 395. The measurement processor 395 generates sensor measurements. The sensor measurements may be stored in a measurement memory (not shown). The sensor measurements may be sent to a display/transmission device to be either displayed on a display in a housing with the sensor electronics or transmitted to an external device.

The sensor electronics device 360 may be a monitor which includes a display to display physiological characteristics readings. The sensor electronics device 360 may also be installed in a desktop computer, a pager, a television including communications capabilities, a laptop computer, a server, a network computer, a personal digital assistant (PDA), a portable telephone including computer functions, an infusion pump including a display, a glucose sensor including a display, and/or a combination infusion pump/glucose sensor. The sensor electronics device 360 may be housed in a cellular phone, a smartphone, a network device, a home network device, and/or other appliance connected to a home network.

Figure 5:
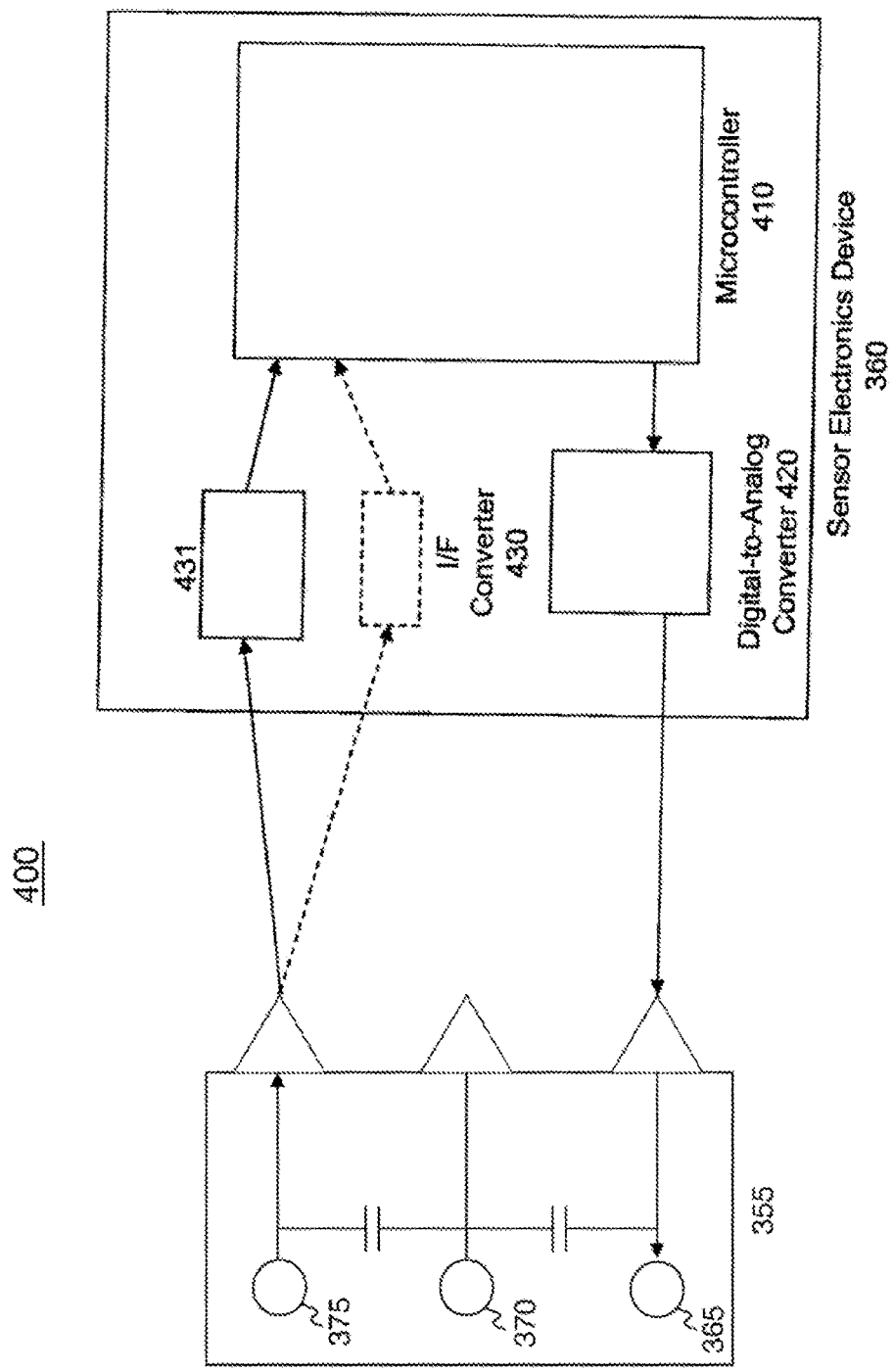
FIG. 5 illustrates an alternative embodiment including a sensor and a sensor electronics device in accordance with one or more embodiments.

FIG. 5 illustrates an alternative embodiment including a sensor and a sensor electronics device according to an embodiment of the present disclosure. The sensor set or sensor system 400 includes a sensor electronics device 360 and a sensor 355. The sensor 355 includes a counter electrode 365, a reference electrode 370, and a working electrode 375. The sensor electronics device 360 includes a microcontroller 410 and a digital-to-analog converter (DAC) 420. The sensor electronics device 360 may also include a current-to-frequency converter (I/F converter) 430.

The microcontroller 410 includes software program code or programmable logic which, when executed, causes the microcontroller 410 to transmit a signal to the DAC 420, where the signal is representative of a voltage level or value that is to be applied to the sensor 355. The DAC 420 receives the signal and generates the voltage value at the level instructed by the microcontroller 410. In embodiments of the disclosure, the microcontroller 410 may change the representation of the voltage level in the signal frequently or infrequently. Illustratively, the signal from the microcontroller 410 may instruct the DAC 420 to apply a first voltage value for one second and a second voltage value for two seconds.

The sensor 355 may receive the voltage level or value. In an embodiment of the disclosure, the counter electrode 365 may receive the output of an operational amplifier which has as inputs the reference voltage and the voltage value from the DAC 420. The application of the voltage level causes the sensor 355 to create a sensor signal indicative of a concentration of a physiological characteristic being measured. In an embodiment of the disclosure, the microcontroller 410 may measure the sensor signal (e.g., a current value) from the working electrode. Illustratively, a sensor signal measurement circuit 431 may measure the sensor signal. In an embodiment of the disclosure, the sensor signal measurement circuit 431 may include a resistor and the current may be passed through the resistor to measure the value of the sensor signal. In an embodiment of the disclosure, the sensor signal may be a current level signal and the sensor signal measurement circuit 431 may be a current-to-frequency (I/F) converter 430. The I/F converter 430 may measure the sensor signal in terms of a current reading, convert it to a frequency-based sensor signal or EIS signal, and transmit the frequency-based sensor signal or EIS signal to the microcontroller 410. In embodiments of the disclosure, the microcontroller 410 may be able to receive frequency-based sensor signals easier than non-frequency-based sensor signals. The microcontroller 410 receives the sensor signal, whether frequency-based or non-frequency-based, and determines a value for the physiological characteristic of a subject, such as a blood glucose level. The microcontroller 410 may include program code, which when executed or run, is able to receive the sensor signal and convert the sensor signal to a physiological characteristic value.

In one embodiment of the disclosure, the microcontroller 410 may convert the sensor signal to a blood glucose level. While converting the sensor signal to a blood glucose value, the microcontroller 410 may use one or more models, which are specific ways to use the sensor signal to calculate the blood glucose value. In some embodiments, the microcontroller 410 may utilize measurements (e.g., sensor signals and electrochemical impedance spectroscopy (EIS) signals from the sensor 355) stored within an internal memory in order to determine the blood glucose level of the subject. In some embodiments, the microcontroller 410 may utilize measurements stored within a memory external to the microcontroller 410 to assist in determining the blood glucose level of the subject.

After the physiological characteristic value is determined by the microcontroller 410, the microcontroller 410 may store measurements of the physiological characteristic values for a number of time periods. For example, a blood glucose value (BG) may be sent to the microcontroller 410 from the sensor every second or five seconds, and the microcontroller may save sensor measurements for five minutes or ten minutes of BG readings. The microcontroller 410 may transfer the measurements of the physiological characteristic values to a display on the sensor electronics device 360. For example, the sensor electronics device 360 may be a monitor which includes a display that provides a blood glucose reading for a subject. In one embodiment of the disclosure, the microcontroller 410 may transfer the measurements of the physiological characteristic values to an output interface of the microcontroller 410. The output interface of the microcontroller 410 may transfer the measurements of the physiological characteristic values, e.g., blood glucose values, to an external device, e.g., an infusion pump, a combined infusion pump/glucose meter, a computer, a personal digital assistant, a pager, a network appliance, a server, a cellular phone, or any computing device.

Figure 6:
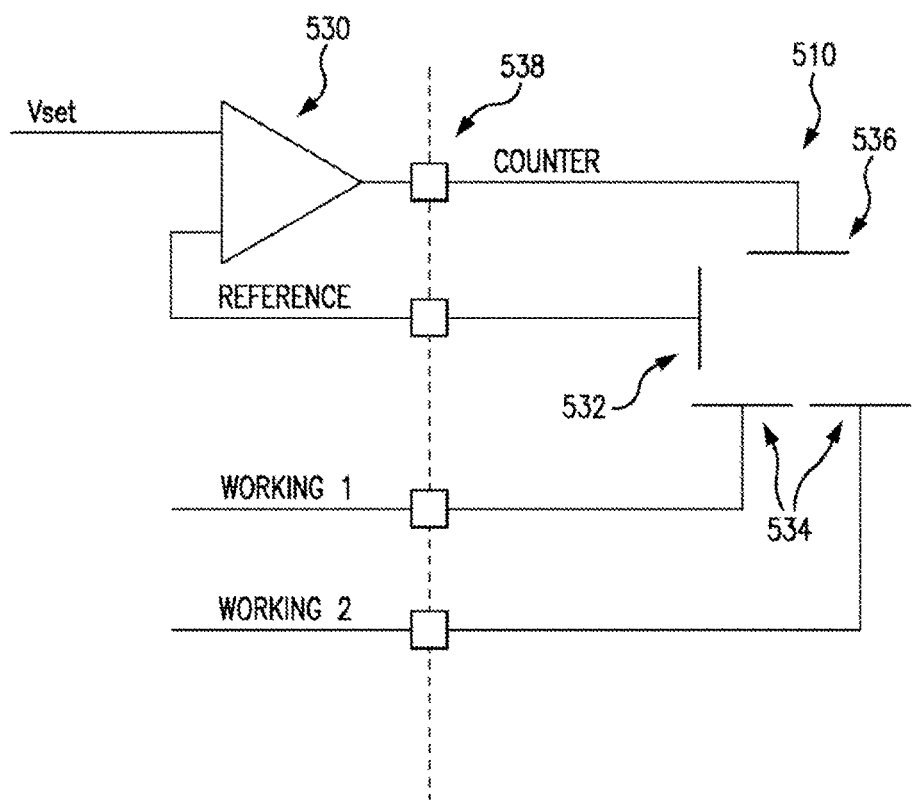
FIG. 6 illustrates an electronic block diagram of the sensor electrodes and a voltage being applied to the sensor electrodes in accordance with one or more embodiments.

FIG. 6 illustrates an electronic block diagram of the sensor electrodes and a voltage being applied to the sensor electrodes according to one embodiment of the present disclosure. In the embodiment illustrated in FIG. 6, an op amp 530 or other servo controlled device may connect to sensor electrodes 510 through a circuit/electrode interface 538. The op amp 530, utilizing feedback through the sensor electrodes, attempts to maintain a prescribed voltage (what the DAC may desire the applied voltage to be) between a reference electrode 532 and a working electrode 534 by adjusting the voltage at a counter electrode 536. Current may then flow from a counter electrode 536 to a working electrode 534. Such current may be measured to ascertain the electrochemical reaction between the sensor electrodes 510 and the biomolecule of a sensor that has been placed in the vicinity of the sensor electrodes 510 and used as a catalyzing agent. The circuitry disclosed in FIG. 6 may be utilized in a long-term or implantable sensor or may be utilized in a short-term or subcutaneous sensor.

In a long-term sensor embodiment, where a glucose oxidase (GOx) enzyme is used as a catalytic agent in a sensor, current may flow from the counter electrode 536 to a working electrode 534 only if there is oxygen in the vicinity of the enzyme and the sensor electrodes 510. Illustratively, if the voltage set at the reference electrode 532 is maintained at about 0.5 volts, the amount of current flowing from the counter electrode 536 to a working electrode 534 has a fairly linear relationship with unity slope to the amount of oxygen present in the area surrounding the enzyme and the electrodes. Thus, increased accuracy in determining an amount of oxygen in the blood may be achieved by maintaining the reference electrode 532 at about 0.5 volts and utilizing this region of the current-voltage curve for varying levels of blood oxygen. Different embodiments of the present disclosure may utilize different sensors having biomolecules other than a glucose oxidase enzyme and may, therefore, have voltages other than 0.5 volts set at the reference electrode. A stabilization period is needed for many sensors in order for the sensor 510 to provide accurate readings of the physiological parameter of the subject. During the stabilization period, the sensor 510 does not provide accurate blood glucose measurements. Users and manufacturers of the sensors may desire to improve the stabilization timeframe for the sensor so that the sensors can be utilized quickly after insertion into the subject's body or a subcutaneous layer of the subject.

Even after stabilization timeframe or during initial implantation or insertion of the sensor 510, the sensor 510 may provide inaccurate sensor signals due to signal noises in the sensor, electrochemical byproducts caused by oxidation and reduction, or a foreign body response that prevents oxygen from the interstitial tissue from reaching the chemistry layers on top of the working electrode, specially the glucose oxidase layer. When the inaccuracy of the sensor signal becomes higher than a threshold, the working electrode 534 should be replaced and the user of the sensor needs to be notified. To lengthen the lifetime of the working electrode 534, an agent is coated over the working electrode 534. In an embodiment, the agent is coated on a secondary polyimide flex that is placed adjacent to the primary flex which has the working electrode. The purpose of the agent is to inhibit the foreign body response so that sufficient oxygen from the interstitial tissue reaches the chemistry layers deposited above the working electrode. Such agent may be dexamethasone, dexamethasone phosphate, dexamethasone acetate, corticosteroids, NSAIDs, antifibrotic agents, and/or siRNA. With the presence of this coating of the agent, the lifetime of working electrode 534 can be lengthened from about a week to about 16 days or more.

In an alternative embodiment, the agent may be coated on the primary flex, which has the working electrode. The agent may be coated in the top portion of the primary flex and the working electrode may be on the bottom portion of the primary flex. In an aspect, the agent may be coated in the bottom portion of the primary flex and the working electrode may be on the top portion. In another aspect, the agent and the working electrode may be positioned at different places from each other on the primary flex. Regardless of positions of the agent and the working electrode, when the glucose sensor is mounted on the user, the primary flex enters into the body of the user so that the agent and the working electrode also enter into the body.

Figure 7:
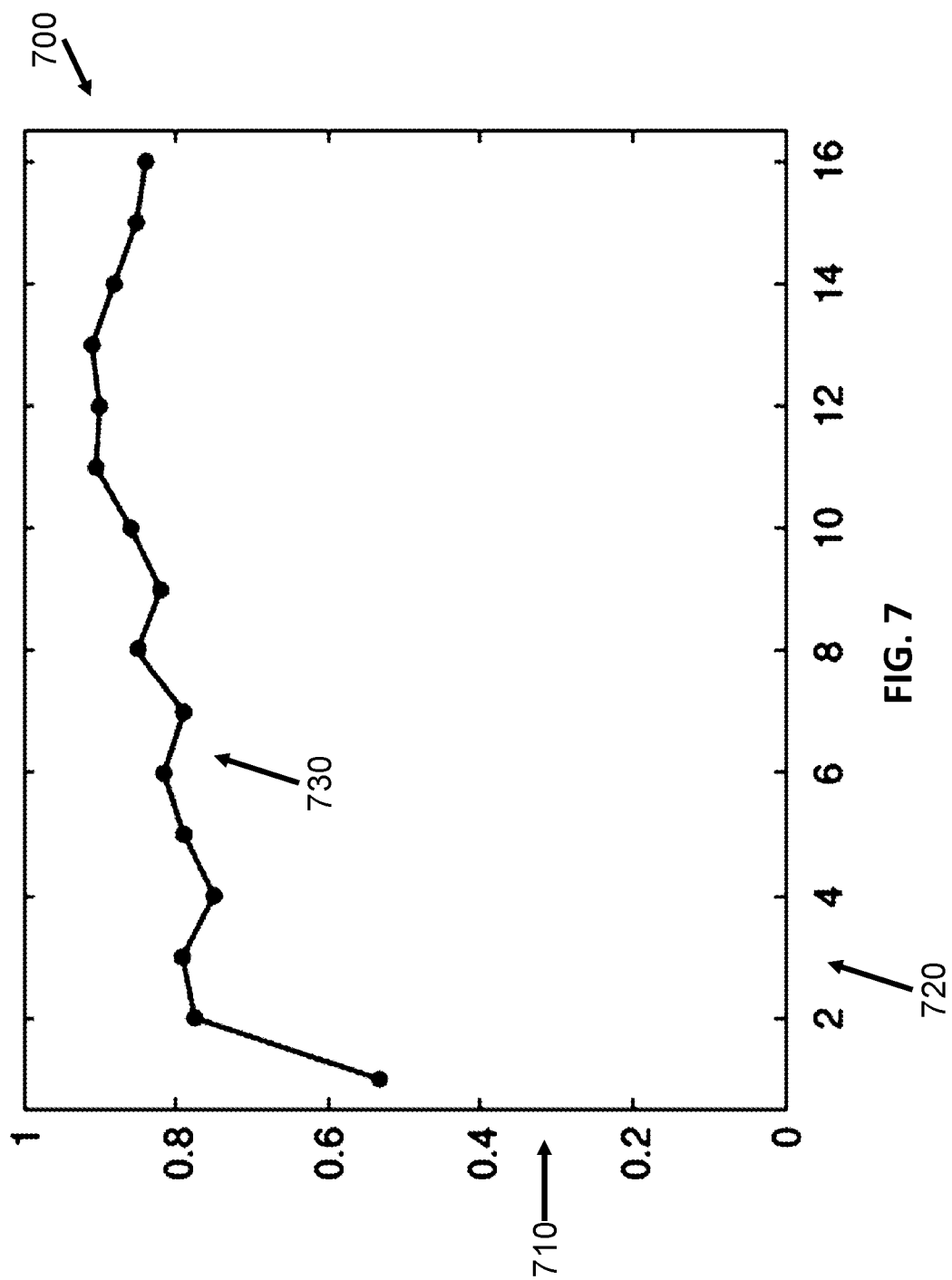
FIG. 7 illustrates a graphical representation of R-squared values of changes in real impedance in accordance with one or more embodiments.

Even though the agent lengthens the lifetime of the sensor, when the sensor 510 is inserted into a body of a user, the agent may be eluted from the working electrode 534 and such elution of the agent may affect the measurement data. Specifically, an initial burst of elution of the agent may significantly affect measurement performance of the working electrode 534. For example, illustrated in FIG. 7 is a graph 700 showing a linear regression plot 730 of the performance of a working electrode for 16 days. The linear regression plot 730 shows effects from elution of the agent from the working electrode. The vertical axis 710 represents an R-squared or $R^2$ value, which is a statistical measure of how close the measurement data are to a fitted regression line and the horizontal axis 720 represents days while the working electrode is inserted into the body of the user. The higher the $R^2$ value is, the more the measurement data fit to the regression line. In other words, a high $R^2$ value shows that the measurement values are closely positioned around a linear line. From day 1 to day 2, the $R^2$ value jumps from about 0.5 to about 0.8. The low value 0.5 at day 1 may be caused by the initial burst of the agent from working electrode. Due to the low $R^2$ values at day 1, the measurement data do not have a strong linear property and should be compensated or adjusted before providing measurement data based on the sensor signals so that accurate measurement data can be later calculated. From day 2 to day 16, the $R^2$ values are close to or over 0.8, meaning that the measurement data based on the sensor signals are close to a fitted regression line. Thus, by adjustment may be made during day 1 or 2 to improve linearity. The EIS signals from the glucose sensor are used to calculate frequency related values. For example, the frequency related values or EIS values may be a real, imaginary, magnitude, and/or phase component of the EIS signal in the frequency domain.

Figure 8:
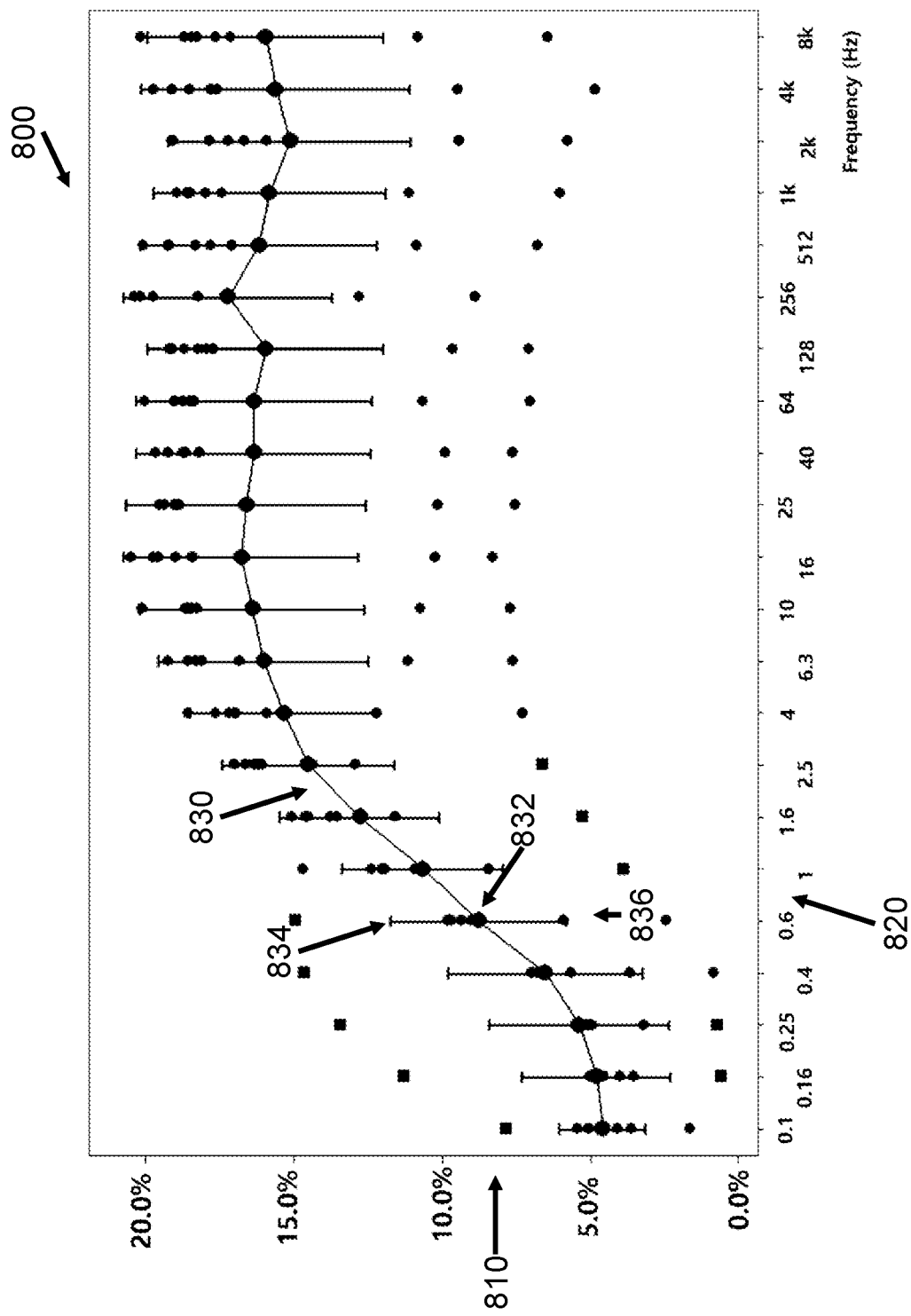
FIG. 8 illustrates a graphical representation of percent changes in real impedance in accordance with one or more embodiments.

FIG. 8 illustrates a graph 800 showing percent changes in frequency related values or EIS values while an agent is introduced into a body of a user according to embodiments of the disclosure. The vertical axis 810 represents percent changes in the frequency related values and the horizontal axis 820 represents frequencies ranging from 0 Hz to 8 kHz. The upper bound value of the frequencies of the horizontal axis 820 is provided as an example and may be greater than 8 kHz. The graph 800 includes a curve 830 showing the percent changes across the frequency range. The curve 830 is an interval plot showing that a mean 832 is located in the center and the top 834 and the bottom 836 indicate a range including a certain percentage (e.g., 99%, 95%, 90%, etc.) of the frequency related values. In an embodiment, the curve 830 may be a box and whisker chart or any other graphical representation illustrating relevant features of the frequency related values.

The curve 830 may be obtained from a solution, which includes 200 mg/dl concentration of glucose. The working electrode produces sensor signals in the time domain to calculate a sensor glucose value and EIS signals in the frequency domain to obtain frequency related values (e.g., real impedance). A first frequency related value, which is used as a reference value, is obtained at the initiation time when the glucose sensor is mounted on a user for a continuous monitoring of the glucose level in the body of the user and starts monitoring the glucose level. In particular, at the initiation time when the glucose sensor is mounted, the working electrode of the glucose sensor enters into the body of the user and influence of the agent is minimal in sensor signals and EIS signals. The EIS values may be measured along the lifetime of the glucose sensor and compared with the reference value. By comparing the later obtained EIS values with the reference value at each frequency, the curve 830 may be obtained.

In embodiments, the glucose sensor may include two flexes, one flex or primary flex incudes a working electrode or first working electrode, which provides sensor signals for glucose sensor values and EIS signals for frequency related values, and the other flex or secondary flex is coated with an agent, which lengthens the lifecycle of the glucose sensor. At an initiation time when the sensor is mounted on the body of the user and starts measuring a glucose level of the user, influence of the agent on the measurement values is minimal. Thus, the EIS value measured at the initiation time may be used as a reference value, which is to be compared with EIS values measured after the initiation time during the lifetime of the sensor. Even in a configuration, in which the sensor has one flex and the agent is coated over a portion different from the position of the working electrode in the flex, the reference value may be the EIS value measured at the initiation time.

In an embodiment, the frequency related values are real impedance values at a frequency in the high frequency range from 4 Hz to 8 kHz. For example, if the first real impedance value or the reference value measured at the initiation time is 10 kΩ and the second real impedance value measured after the initiation time is 12 kΩ, the percent change is 20%. The curve 830 is obtained by connecting the mean value of the real impedance values at each frequency during the lifetime of the sensor. In an embodiment, the curve 830 may be obtained by connecting the median value of the real impedance value at each frequency. Some data points are shown outside of the range defined by the top 834 and the bottom 836, and are considered as outliers.

Based on the curve 830, the percent changes of the mean values significantly change from about 5% to 15% across the low frequency range from 0 Hz to 4 Hz. On the contrary, in the high frequency range from 4 Hz to 8 kHz, the percentage changes of the mean values in real impedance are steady between 15% and 20%. Differently put, the effect of the elution of the agent varies in the sensor signals in the low frequency range but is substantially constant in the high frequency range. The upper bound of the high frequency range may be greater than 8 kHz.

Figure 9:
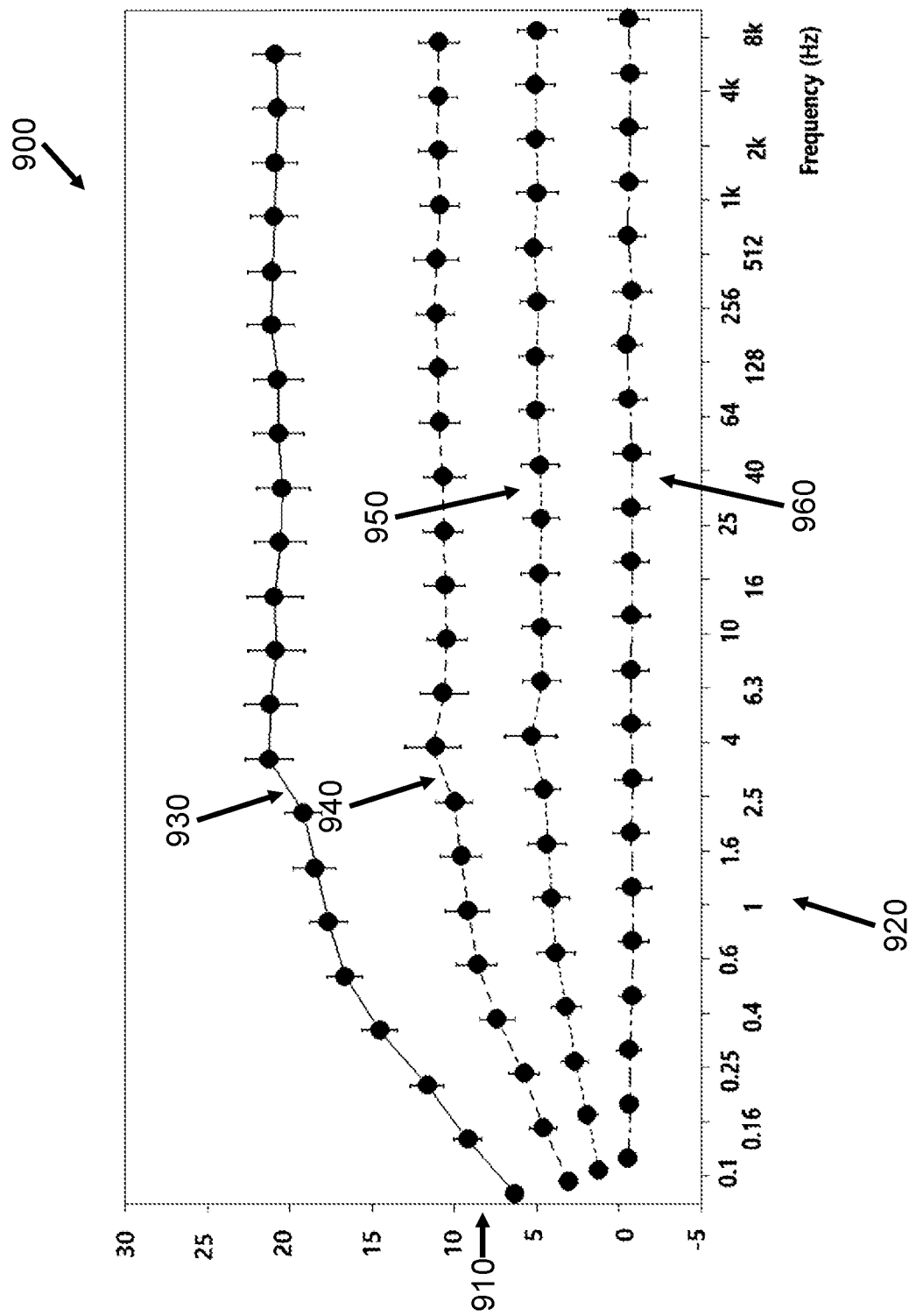
FIG. 9 illustrates graphical representations of percent changes in real impedance of different concentrations of an agent in accordance with one or more embodiments.

FIG. 9 illustrates a graph 900 including four curves or interval plots 930-960 showing mean values in the middle and the top and bottom indicating a range including a certain percentage (e.g., 99%, 95%, 90%, etc.) of frequency related values. The horizontal axis 920 represents frequencies ranging from 0 Hz to 8 kHz, and the vertical axis 910 represents a percent change of frequency related values from the baseline. Frequency related values or EIS values are measured by the working electrode in a solution, which includes 200 mg/dL concentration of glucose with different concentrations of the agent. The baseline or the reference value is measured in the solution without introduction of the agent, which lengthens the lifetime of the sensor.

The curve 930 is obtained in the solution with 20 μg/ml concentration of the agent, the curve 940 is obtained in the solution with 10 μg/ml concentration of the agent, the curve 950 is obtained in the solution with 5 μg/ml concentration of the agent, and the curve 960 is obtained in the solution with 1 μg/ml concentration of the agent. The curve 960 shows substantially constant percent changes across the frequencies with the lowest concentration of the agent, and the curve 950 shows an increase in the low frequency range from 0 Hz to 4 Hz and substantially constant percent changes in the high frequency range from 4 Hz to 8 kHz. The curves 930 and 940 also show an increase in the low frequency range and substantially constant percent changes in the high frequency range from 4 Hz to 8 kHz. Thus, when the concentration of the agent is between 0 and 20 μg/ml in the glucose solution, the percent changes in real impedance in the high frequency range are substantially constant. In other words, when a percent change in real impedance at the high frequency range is calculated, the concentration of the agent can be retrospectively calculated. In an embodiment, the concentration of the agent may be calculated by linear interpolation based on the relationship between the known concentrations and percent changes. In this regard, a lookup table, which shows the relationship between the concentrations and percent changes in the upper frequency range, may be stored in the memory of the sensor. In another embodiment, the memory of the sensor may include other relationship lookup tables for other agents, which can lengthen the lifetime of the working electrode.

Figure 10:
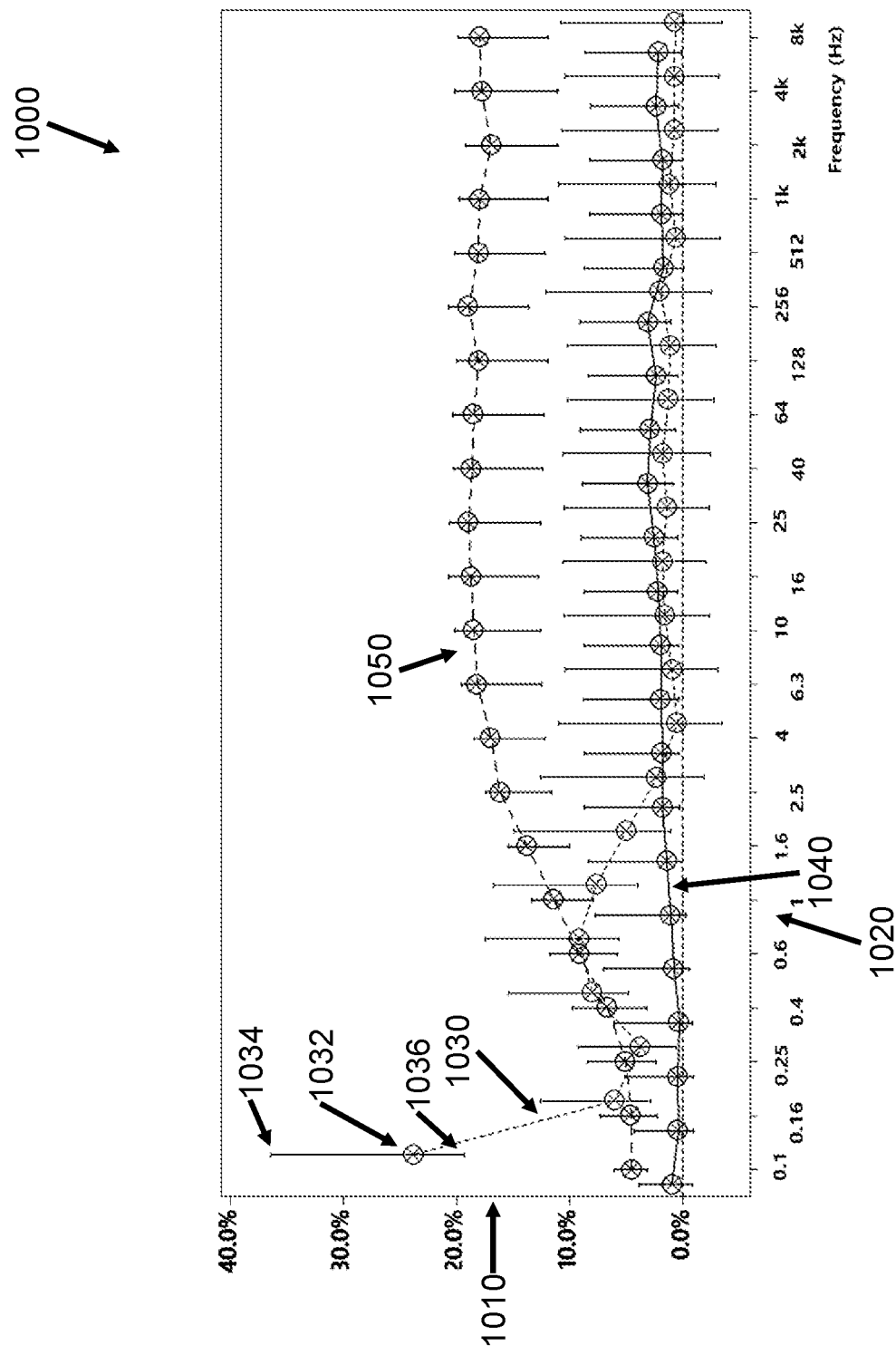
FIG. 10 illustrates graphical representations of percent changes in real impedance before and after a working electrode is coated with an agent in accordance with one or more embodiments.

Generally, body fluid of a patient includes various chemicals including glucose. Thus, such chemicals together with the agent, which is eluted into the body fluid, may affect the sensor signals. FIG. 10 shows a graph 1000 illustrating percent changes based on chemicals in the body fluid according to embodiments of the disclosure. The vertical axis 1010 represents the percent changes in real impedance, the horizontal axis 1020 represents the frequency range from 0 Hz to 8 kHz. The sensor signals may be obtained in a base solution, which includes 200 mg/dL concentration of glucose. The graph 1000 includes three curves 1030, 1040, and 1050 showing percent changes of the frequency related values (e.g., real impedance) with different chemicals. Each curve includes an interval plot at each frequency. The interval at each frequency may include 95% of all real impedance values but can be adjusted. Specifically, reference numeral 1032 may show a median value of the real impedance values at 0.1 Hz and the range defined by the top value 1034 and the bottom value 1036 includes 95% of all the real impedance values at 0.1 Hz. The curve 1030 is obtained by connecting the median values of the real impedance at each frequency with 2 mg/dL concentration of Acetaminophen (AC) in the base solution, the curve 1050 is obtained by connecting the median values of the real impedance at each frequency with 10 μg/ml concentration of dexamethasone acetate flex (DXAC) in the base solution, and the curve 1040 is obtained by connecting the median values of the real impedance at each frequency with 0.1% concentration of oxygen in the base solution.

In the low frequency range from 0 Hz to 4 Hz, the curve 1030 shows increases and decreases, the curve 1050 shows increases, and the curve 1040 shows about constant tendency. On the other hand, in the high frequency range from 4 Hz to 8 kHz, all curves 1030-1050 show substantially steady tendency. Further, the curves 1030 and 1040 show minor percent changes, which are close to 0.0% in the high frequency range. Since the effects of oxygen and AC are negligible in the high frequency range, DXAC, as an example of the agent, which is to coat the working electrode, shows the majority of effects in the high frequency range. In other words, if the effect of the agent in the upper frequency range is compensated for or removed from the EIS signals, sensor signals can be adjusted so that substantially accurate sensor glucose values can be provided. The upper bound of the high frequency range may be greater than 8 kHz.

In consideration of both FIGS. 9 and 10, if percent changes in the upper frequency range is determined, the concentration of the agent can be also determined. Since the percent change characteristics vary because of the agent, the memory of the sensor may include a lookup table for each agent.

Figure 11:
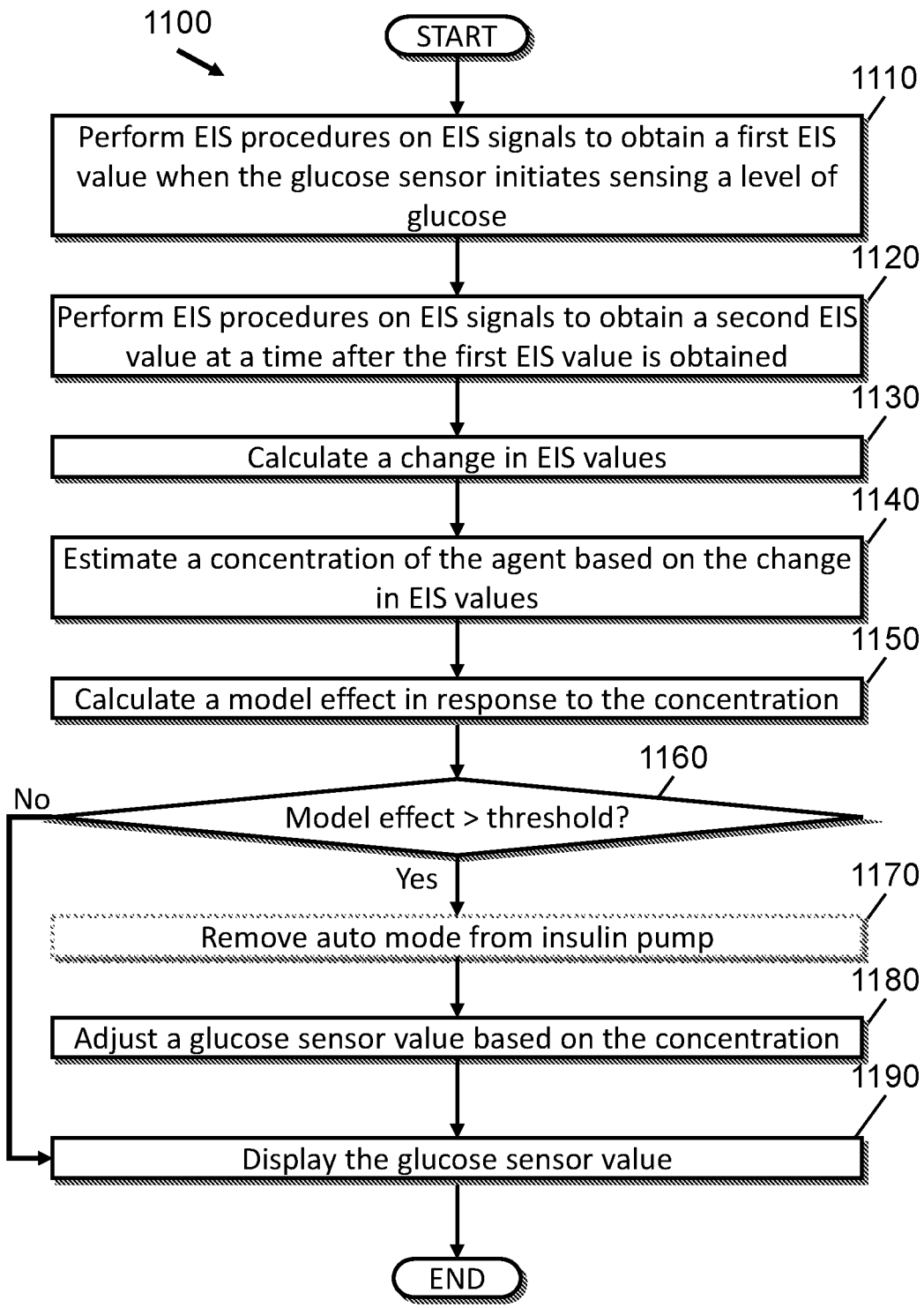
FIG. 11 illustrates a flowchart of a process for compensating for the effects of an agent in accordance with one or more embodiments.
Figure 12:
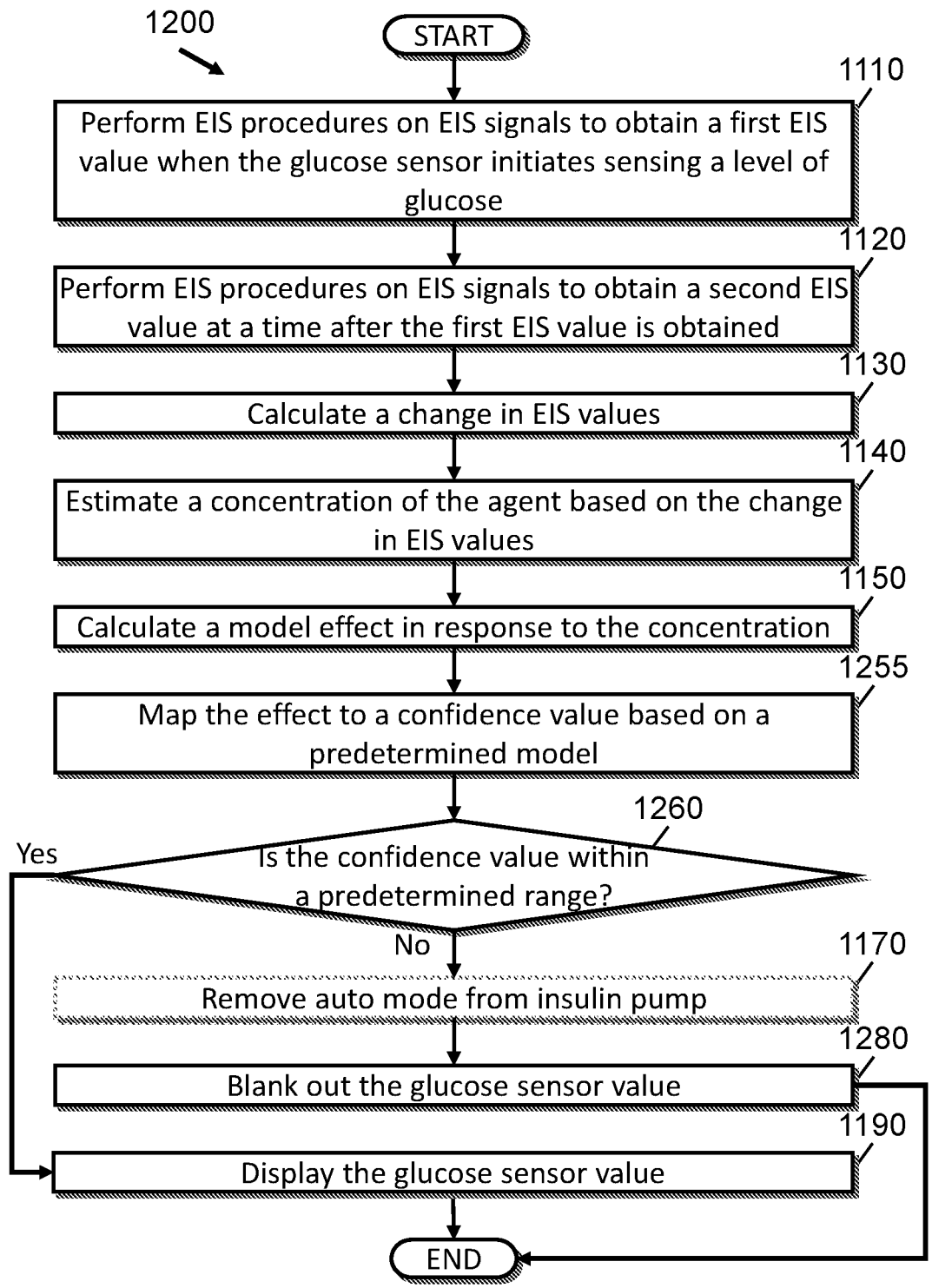
FIG. 12 illustrates a flowchart of a process for compensating for the effects of an agent in accordance with one or more embodiments.

FIGS. 11 and 12 illustrate flowcharts of methods 1100 and 1200 for compensating for elution of an agent, which lengthens the lifetime of a working electrode of a glucose sensor according to embodiments of the disclosures. The method 1100 is performed by comparing EIS values, which are obtained before and after the agent is coated on the working electrode of the sensor. In particular, the working electrode of the sensor produces sensor signals in the time domain and electrochemical impedance spectroscopy (EIS) signals in the frequency domain. An EIS value, which is a frequency related value, is calculated from the EIS signals. For example, a real impedance value, as an example of the EIS value, is calculated by dividing voltage signal of the EIS signal by current signal of the EIS signal. At step 1110, an EIS procedure is performed on EIS signals to obtain a first EIS value, where the EIS signals are obtained at an initiation time when the sensor starts measuring a level of glucose in the body of the user. The first EIS value may be stored in an internal or external memory of the glucose sensor and accessed at step 1110. The first EIS value includes a real and imaginary impedance, voltage, and current value over a frequency range from 0 Hz to 8 kHz.

After obtaining the first EIS value is obtained, the agent, which lengthens the lifetime of the working electrode, starts eluding into the body and affecting glucose measurement values. At step 1120, another EIS signal is produced by the working electrode and processed via an EIS procedure to produce a second EIS value at a second time after the first EIS value is obtained. The second EIS value may be stored in the internal or external memory of the glucose sensor and accessed at step 1120. Considering FIG. 7, the second time may be one or two days during which the agent has significant effects on the EIS signals from the working electrode. In aspects, the second time may be more or less than one or two days.

In an embodiment, the glucose sensor may have a primary flex including a first working electrode, which is not coated with the agent, and a secondary flex, which is coated with the agent. In another embodiment, the glucose sensor may have one flux including the working electrode and a portion of the flex is coated with the agent. The location of the coating by the agent may be different from the location of the working electrode in the flex. A profile used for the two-flex glucose sensor may be different from a profile used for the one-flex glucose sensor.

At step 1130, the first and second EIS values are compared to calculate a percent change from the first EIS value to the second EIS value. In particular, the percent change is calculated from real impedance at a high frequency, which falls within the high frequency range from 4 Hz and 8 kHz. As described above, real impedance in the high frequency range is affected by the agent and effects from other chemical compounds in the body are minimal compared to those from the agent on the sensor signals in the high frequency range. The upper bound of the high frequency range may be greater than 8 kHz.

In embodiments, based on the lookup table, which corresponds to the agent and is stored in the internal or external memory of the glucose sensor, a concentration of the agent in the body of the user is estimated based on the percent change of the real impedance in the high frequency range at step 1140. In a case where there is no match in the lookup table, interpolation or extrapolation may be performed to calculate the concentration of the agent.

In an embodiment, the first and second EIS values may be accessed in every predetermined period (e.g., 20 minutes, 1 hour, 2 hours, a day, two days, etc.). For example, when a subsequent EIS value is accessed after the predetermined period since a previous EIS value has been accessed, the previous EIS value is considered as the first EIS value and the subsequent EIS value is considered as the second EIS value. In this situation, a rate of change in the first and second EIS values rather than the percent change between them may be calculated at step 1130 and used to calculate the concentration of the agent at step 1140.

As described above, one or more models may be used to calculate blood glucose values based on the EIS values and sensor values. At step 1150, the model effect in response to the concentration of the agent is calculated based on a model used for calculating blood glucose values. For example, sensor signals, iSig, which is a current signal measured at the working electrode, may be corrected by the following equation:

$$WE_{corrected\_iSig} = WE_{iSig} * [Coefficient_A * EIS_{frequency_x} + Coefficient_B],$$

where $WE_{iSig}$ is the sensor signal, $WE_{corrected\_iSig}$ is the corrected or adjusted sensor signal, $EIS_{frequency_x}$ may be a real, imaginary, magnitude, and/or phase component of the EIS signals at a given frequency x, and $Coefficient_A$ and $Coefficient_B$ are coefficients based on the model. The $Coefficient_A$ and $Coefficient_B$ may depend on a sensor wear depending on the day of usage of the sensor, the percent rate of change of the EIS value at the given frequency x, a rate of change of $WE_{iSig}$, and a measured sensitivity of the $WE_{iSig}$ to changes in glucose on the given day of usage. $Coefficient_A$ and $Coefficient_B$ may vary depending on a model. The day of usage may be from day 1 to day 17 or the last day of the lifetime of the sensor. The give frequency x may be any frequency from 0.1 Hz to 10 kHz.

After the model effect is calculated, it is determined at step 1160 whether or not the model effect is greater than a threshold. When it is determined that the model effect is greater than the threshold, the sensor is considered as not working properly due to the effects of the agent. The box referenced by step 1170 is surrounded by dotted lines indicating that it is an option that, in a case where it is determined that the model effect is greater than the threshold, an auto mode may be removed from the insulin pump at step 1170, thereby preventing the insulin pump from automatically injecting insulin based on inaccurate blood glucose values. In an embodiment, removal of the auto mode may be notified to the user and/or related medical professionals. The notification may be displayed on a screen of the sensor system, or sent wirelessly or in a wired connection to the user.

In a case where it is determined that the model effect is greater than the threshold, the effect of elution of the agent is compensated by adjusting a sensor glucose value based on the concentration of the agent at step 1180. The adjusted glucose sensor value is displayed on a screen of the display at step 1190.

In a case where it is determined that the model effect is not greater than the threshold in step 1160, the glucose sensor is considered as working properly. Thus, the sensor glucose value is displayed without compensating for the agent in step 1190. The auto mode may be maintained in this case because the sensor glucose values are considered as proper. The method 1100 may be ended here or repeatedly perform steps 1110-1190.

The method 1200 as illustrated FIG. 12 includes the same steps as steps 1110-1150, 1170, and 1190 of the method 1100 and thus descriptions of the same steps can be found in those of FIG. 11 above. The difference between the methods 1100 and 1200 is that, instead of step 1160 of the method 1100, the method 1200 includes steps 1255 and 1260. At step 1255, the calculated model effect is mapped to a confidence value, which may have a range from 0 to 10 or any range of values. This range of values is a confidence interval. At step 1260, it is determined whether the confidence value falls within a predetermined range, which is a subset of the confidence interval. The predetermined range may be from 1 to 5 or 1 to 7. When the confidence value falls within the predetermined range, that is an indication that the glucose sensor is working properly. Thus, in a case where the confidence value is determined to be within the predetermined range at step 1260, the sensor glucose value is displayed to the user at step 1190.

In an embodiment, in a case where the confidence value is close to the upper bound of the predetermined range, the sensor glucose value may be adjusted to compensate for the agent and the adjusted sensor glucose value may be displayed to the user at step 1190.

In a case where the confidence value is determined to fall outside the predetermined range, the auto mode may be removed at step 1170, as an option, to prevent the insulin pump from automatically injecting insulin based on inaccurate blood glucose values. Since it is believed that the glucose sensor is not working properly in this case, the sensor glucose value is also considered as falling outside of an acceptable range. Thus, at step 1280, the sensor glucose value is blanked out and not be displayed to the user. As in the method 1100, the method 1200 may also end here or repeatedly perform steps 1110-1150, 1255, 1260, 1170, 1280 and 1190 during the lifetime of the glucose sensor. Thus, the difference between the methods 1100 and 1200 is, in determining whether the sensor is working properly, the method 1200 uses a range of values (e.g., the confidence interval), while the method 1100 uses a single threshold value.

While the description above refers to particular embodiments of the present disclosure, it will be understood that many modifications may be made without departing from the spirit thereof. Additional steps and changes to the order of the algorithms can be made while still performing the key teachings of the present disclosure. Thus, the accompanying claims are intended to cover such modifications as would fall within the true scope and spirit of the present disclosure. The presently disclosed embodiments are, therefore, to be considered in all respects as illustrative and not restrictive, the scope of the disclosure being indicated by the appended claims rather than the foregoing description. All changes that come within the meaning of, and range of, equivalency of the claims are intended to be embraced therein.

What is claimed is:

1. A method for compensating for an agent which lengthens a life of a glucose sensor monitoring a level of glucose in a body of a user, the glucose sensor including a first flex having a working electrode and a second flex being coated with the agent, the method comprising:
    accessing a first electrochemical impedance spectroscopy (EIS) value of at least one parameter based on first EIS signals from the working electrode at an initiation time when the first flex and the second flex enter into the body of the user and the glucose sensor initiates sensing a level of glucose;
    accessing a second EIS value of the at least one parameter based on second EIS signals from the working electrode at a second time after the initiation time;
    calculating a change in the at least one parameter between the first EIS value and the second EIS value;
    estimating a concentration of the agent based on the change in the at least one parameter;
    calculating a model effect in response to the concentration;
    determining whether the model effect is greater than a threshold; and
    in a case where the model effect is determined to be greater than the threshold:
        adjusting a sensor glucose value based on the concentration and sensor signals from the working electrode; and
        displaying the adjusted sensor glucose value.

2. The method of claim 1, wherein the agent is selected from dexamethasone, dexamethasone phosphate, dexamethasone acetate, corticosteroids, NSAIDs, antifibrotic agents, or siRNA.

3. The method of claim 1, wherein the first and second EIS values are real impedance values at a specific frequency.

4. The method of claim 3, wherein the specific frequency is greater than or equal to 4 Hz.

5. The method of claim 1, further comprising:
    removing an auto mode, which causes an insulin delivery device to automatically deliver insulin to the user based on the sensor glucose value, in a case where the model effect is determined to be greater than the threshold.

6. The method of claim 1, wherein determining whether the model effect in response to the concentration is greater than the threshold is performed by mapping the model effect to a confidence value, and
    wherein the confidence value is within a confidence range.

7. The method of claim 6, wherein determining whether the model effect in response to the concentration is greater than the threshold is further performed by determining whether the confidence value falls within a predetermined range.

8. The method of claim 7, wherein the predetermined range is a subset of the confidence range.

9. The method of claim 7, further comprising:
    in a case where it is determined that the confidence value does not fall within the predetermined range, blanking out the sensor glucose value.

10. A glucose monitoring system comprising:
    a glucose sensor including a first flex having a working electrode and a second flex being covered with an agent, which lengthens a lifetime of the glucose sensor, and monitoring a level of glucose in a body of a user; and
    a controller configured to:
        access a first electrochemical impedance spectroscopy (EIS) value of at least one parameter, the first EIS value based on first EIS signals from the working electrode at an initiation time when the first flex and the second flex enter into the body of the user and the glucose sensor initiates sensing a level of glucose;
        access a second EIS value of the at least one parameter, the second EIS value based on second EIS signals from the working electrode at a second time after the initiation time;
        calculate a change in the at least one parameter between the first EIS value and the second EIS value;
        estimate a concentration of the agent based on the change in the at least one parameter;
        determine whether a model effect in response to the concentration is greater than a threshold; and
        in a case where the model effect is determined to be greater than the threshold:
            adjust a sensor glucose value based on the concentration and sensor signals from the working electrode; and
            display the adjusted sensor glucose value.

11. The glucose monitoring system of claim 10, wherein the agent is selected from dexamethasone, dexamethasone phosphate, dexamethasone acetate, corticosteroids, NSAIDs, antifibrotic agents, or siRNA.

12. The glucose monitoring system of claim 10, wherein the first and second EIS values are real impedance values at a specific frequency.

13. The glucose monitoring system of claim 12, wherein the specific frequency is greater than or equal to 4 Hz.

14. The glucose monitoring system of claim 10, wherein the controller is further configured to remove an auto mode, which causes an insulin delivery device to automatically deliver insulin to the user based on the sensor glucose value, in a case where the model effect is determined to be greater than the threshold.

15. The glucose monitoring system of claim 10, further comprising a display,
    wherein the sensor glucose value is displayed on a screen of the display.

16. The glucose monitoring system of claim 10, wherein the controller determines whether the model effect in response to the concentration is greater than a threshold by:
    mapping the model effect to a confidence value, and
    wherein the confidence value is within a confidence range.

17. The glucose monitoring system of claim 16, wherein the controller determines whether the model effect in response to the concentration is greater than a threshold by further determining whether the confidence value falls within a predetermined range.

18. The glucose monitoring system of claim 17, wherein the predetermined range is a subset of the confidence range.

19. The glucose monitoring system of claim 17, wherein in a case where it is determined that the confidence value does not fall within the predetermined range, the controller is further configured to:
    blank out the sensor glucose value.

20. A non-transitory processor readable medium including instructions stored thereon which, when executed by a processor, causes performance of a method for compensating for an agent, which lengthens a lifetime of a glucose sensor monitoring a level of glucose in a body of a user, the glucose sensor including a first flex having a working electrode and a second flex being coated with the agent, the method comprising:

accessing a first electrochemical impedance spectroscopy (EIS) value of at least one parameter, the first EIS value based on first EIS signals from the working electrode at an initiation time when the first flex and the second flex enter into the body of the user and the glucose sensor initiates sensing a level of glucose;

accessing a second EIS value of the at least one parameter, the second EIS value based on second EIS signals from the working electrode at a second time after the initiation time;

calculating a change in the at least one parameter between the first EIS value and the second EIS value;

estimating a concentration of the agent based on the change in the at least one parameter;

calculating a model effect in response to the concentration;

determining whether the model effect is greater than a threshold; and in a case where the model effect is determined not to be greater than the threshold:

adjusting a sensor glucose value based on the concentration and sensor signals from the working electrode; and displaying the adjusted sensor glucose value.

21. A glucose monitoring system comprising:

a glucose sensor including a flex having a working electrode and monitoring a level of glucose in a body of a user, wherein a portion of the flex is covered with an agent, which lengthens a lifetime of the glucose sensor; and a controller configured to:

access a first electrochemical impedance spectroscopy (EIS) value of at least one parameter, the first EIS value based on first EIS signals from the working electrode at an initiation time when the flex enters into the body of the user and the glucose sensor initiates sensing a level of glucose;

access a second EIS value of the at least one parameter, the second EIS value based on second EIS signals from the working electrode at a second time after the initiation time;

calculate a change in the at least one parameter between the first EIS value and the second EIS value;

estimate a concentration of the agent based on the change in the at least one parameter;

determine whether a model effect in response to the concentration is greater than a threshold; and in a case where the model effect is determined not to be greater than the threshold:

adjust a sensor glucose value based on the concentration; and display the adjusted sensor glucose value.

* * * * *